(12) United States Patent
Pfeiffer et al.

(10) Patent No.: US 8,753,088 B2
(45) Date of Patent: Jun. 17, 2014

(54) PROPELLER BLADE RETENTION DEVICE

(75) Inventors: Kevin Pfeiffer, Wichita, KS (US); Danny Ball, Oxford, KS (US)

(73) Assignee: Textron Innovations Inc., Providence, RI (US)

( * ) Notice: Subject to any disclaimer, the term of this patent is extended or adjusted under 35 U.S.C. 154(b) by 1219 days.

(21) Appl. No.: 12/039,516

(22) Filed: Feb. 28, 2008

(65) Prior Publication Data
US 2009/0220344 A1    Sep. 3, 2009

(51) Int. Cl.
*F03B 3/14* (2006.01)
*F04D 29/36* (2006.01)

(52) U.S. Cl.
USPC .......................................... 416/209

(58) Field of Classification Search
USPC ...... 416/205, 207, 209, 219 R, 220 R, 239, 1; 244/17.11, 17.25, 92, 69, 71
See application file for complete search history.

(56) References Cited

U.S. PATENT DOCUMENTS

| | | | |
|---|---|---|---|
| 3,029,876 A | 4/1962 | Scott | |
| 4,139,330 A * | 2/1979 | Neal | 416/87 |
| 4,717,312 A | 1/1988 | Seeley | |
| 4,762,466 A * | 8/1988 | Bouiller et al. | 416/205 |
| 4,850,801 A * | 7/1989 | Valentine | 416/205 |
| 4,921,403 A * | 5/1990 | Poucher et al. | 416/147 |
| 5,118,256 A | 6/1992 | Violette et al. | |
| 6,015,264 A * | 1/2000 | Violette et al. | 416/146 A |
| 6,196,801 B1 | 3/2001 | Muhlbauer | |
| 6,676,080 B2 * | 1/2004 | Violette | 244/123.1 |
| 7,112,040 B2 * | 9/2006 | Debeneix et al. | 415/160 |
| 2008/0213095 A1 * | 9/2008 | Bech et al. | 416/131 |
| 2008/0279689 A1 * | 11/2008 | Sebald | 416/147 |

FOREIGN PATENT DOCUMENTS

DE       4315080 A1    11/1994

* cited by examiner

*Primary Examiner* — Nathaniel Wiehe
*Assistant Examiner* — Su Htay
(74) *Attorney, Agent, or Firm* — Lathrop & Gage LLP

(57) ABSTRACT

A propeller blade retention system and method of manufacture are disclosed. Because of the design, a truly integral hub is able to house a set of variable pitch blades. Each hub socket establishes a substantially cylindrical interface with its respective blade, making the blade slidably receivable for installation. Each blade is allowed axial rotation, and held inside the socket by a set of angular contact bearings. A snap ring locks the blade against coming back out of the socket. An O-ring is provided in the interface to create a fluid seal. The hub alone accomplishes all of the required load-bearing and weather-seal functions.

21 Claims, 6 Drawing Sheets

PROPELLER BLADE RETENTION DEVICE

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The invention relates generally to aircraft. More specifically, the invention relates to the field of propeller and hub designs.

2. Description of the Related Art

Sophisticated blade retention systems are normally employed in accommodating variable pitch propeller arrangements for aircraft. This is because the system must accommodate the mechanical equipment necessary to rotate each blade on its longitudinal axis, while at the same time adequately secure each blade against the great tensile and rotational loads it must carry when in operation.

Each blade is normally retained inside a hub assembly. Ideally, any reductions in blade and/or hub weight is seen as a significant advance. But it is important that structural integrity not be compromised in these weight reduction pursuits.

SUMMARY

The present invention is defined by the claims below. Embodiments of the present invention include a propeller system. The system includes a hub. The hub has at least one socket having a substantially cylindrical internal surface. An adjustable-pitch blade is received in the hub. The blade has an airfoil portion and a base portion. A substantially cylindrical outer surface is formed on the base of the blade. Thus, the outer surface of the base portion of the blade is slidably receivable in the substantially cylindrical internal surface of the socket.

The blade is lockable against axial translation once installed, but otherwise axially slidable. Once installed, the blade is rotatable relative to its center axis. This enables pitch change in operation.

A sealing member is received in an interface between the substantially cylindrical outer surface of the bottom portion of the blade and the substantially cylindrical internal surface of the socket. This creates a fluid barrier between the inside and outside of the socket, while allowing for axial translation of the blade into the socket during installation, and also allowing for rotation of the blade to change pitch.

The system also includes an angular contact bearing arrangement. This arrangement includes a set of ball bearings which are housed within an inner race on the blade and an outer race on the hub. The outer diameter of the inner race is small enough to enable passage through the substantially cylindrical internal surface of the socket during installation. The outer race is made to have an inside diameter large enough that it does not interfere with the substantially cylindrical outer surface of the blade during installation.

This arrangement enables the hub to be truly integral, in that it is forged from the same integral material for added strength.

Similarly, the inner and outer races are also formed as substantially-integral parts that do not have to be installed in halves, or some other piecemeal fashion.

In embodiments, the substantially cylindrical outer surface exists on a collar provided on the base portion of the blade.

In embodiments, the sealing member is an O-ring which is received in an annular channel defined in the substantially cylindrical outer surface of the blade collar and seals against the substantially cylindrical internal surface of the socket. Alternatively, the O-ring could be received in an annular channel defined in the substantially cylindrical internal surface of the socket and seal against the substantially cylindrical outer surface of the collar.

In embodiments, the upper portion of the substantially cylindrical outer surface on the collar includes an annular groove which receives a snap ring which, when installed in the annular groove in the blade, prevents the blade from falling into the socket by holding the blade out, supported by a shim on the outside of the hub. Conversely, the snap ring contains the shim assembly in place, trapped against the hub within an angular notch defined by a surrounding upcrop. This arrangement of snap ring and shim takes up the slack in the installation of the blades, and prevents the balls of said angular contact bearing from escaping their installed positions.

In some embodiments, each of the: (i) outer diameter of the inner race, (ii) inner diameter of the outer race, (iii) substantially cylindrical internal surface of the socket, and (iv) substantially cylindrical outer surface of the bottom portion of the blade are substantially in line when viewed in cross section.

Also disclosed in embodiments is a method of assembling a propeller system including the steps of manufacturing an integral hub; causing a blade-receiving socket to be formed in the hub, the socket having a substantially cylindrical internal surface; producing a blade to have a base portion which has a substantially cylindrical outer surface which is receivable in and slidably mates with the substantially cylindrical internal surface of the socket; providing an angular contact bearing arrangement inside the socket, the bearing arrangement preventing the blade from coming out of the hub socket, while allowing for rotation on a center axis of the blade; including a locking mechanism to secure the blade against sliding into the hub after installation; and establishing a seal between the substantially cylindrical outer surface of the bottom portion of the blade and the substantially cylindrical internal surface of the socket. The hub, in embodiments, is made of forged metal construction.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The invention is a propeller system. More specifically, a system for securing propeller blades into a one-piece hub. One embodiment is disclosed in FIGS. 1-5, and a second embodiment is disclosed in FIG. 6.

Figure 1:
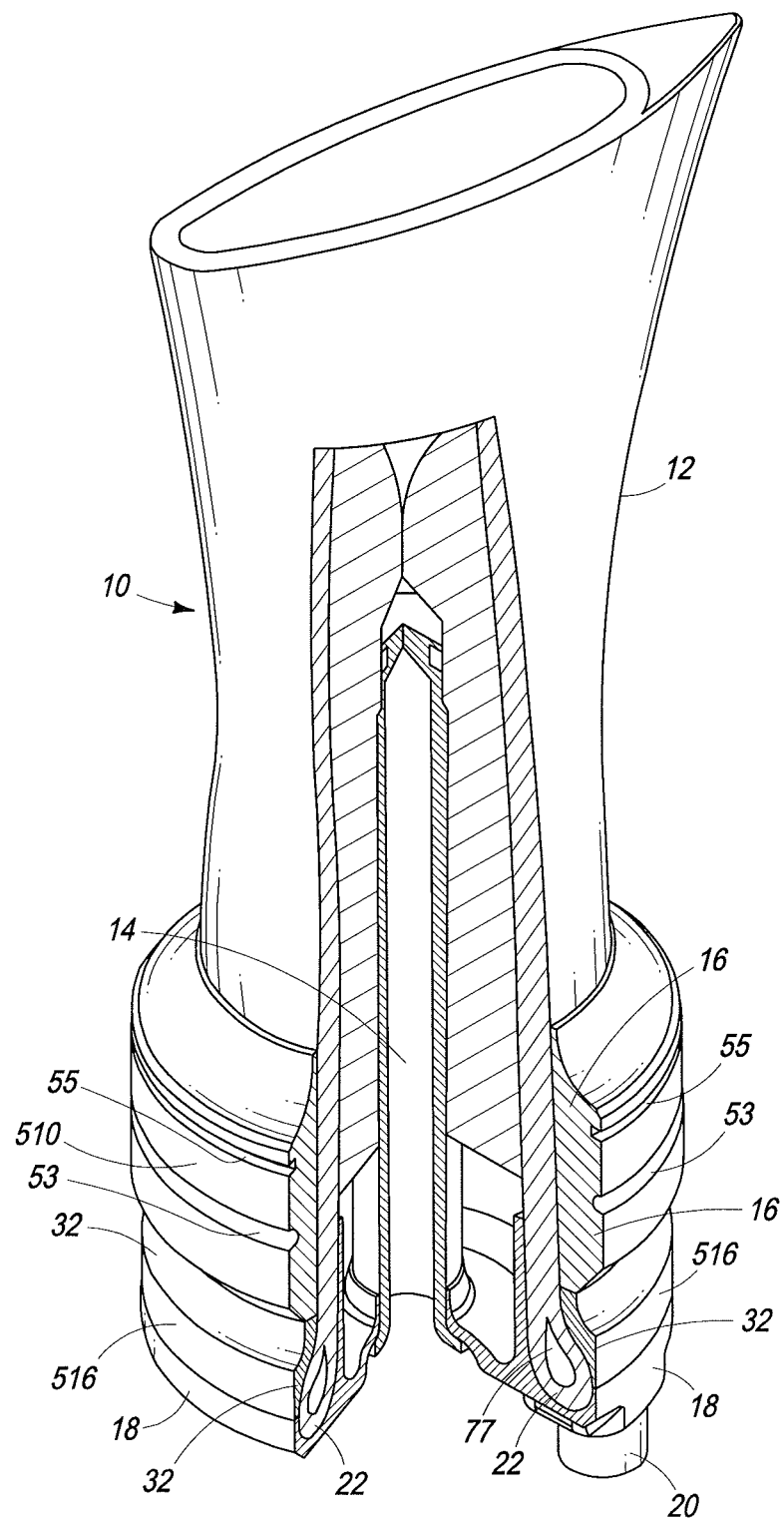
FIG. 1 is a perspective view of a single propeller blade before installation into the hub in a first embodiment.

Referring first to FIG. 1, a propeller blade 10 is comprised of carbon fiber composite materials. It is also possible, and is contemplated that other composite materials could be used instead, the use of such would also fall within embodiments of the current disclosures. Blade 10 has an airfoil portion 12 and a base. The base of the blade includes a cast plastic collar portion 16 which is received in a blade cup 18. Inside the blade is a hollow tubular area 14. In the disclosed embodiment, the blade is fixed in collar 16 using an integral loop 22 formed at the blade bottom. Loop 22 is formed around an internal ring 77 which enables the bottom of the blade to be secured. Although a loop/ring arrangement is used in the embodiments depicted, it should also be understood that other techniques of securing the blade within the collar could be used instead and still fall within the scope of embodiments contemplated herein. Collar 16 includes a snap-ring-receiving groove 55 and an O-ring receiving annular channel 53. An annular inner race 32 is also fixed in place about the periphery as shown. A pin 20 at the bottom of blade 10 is what is used to change the pitch of the blade, as will be known to those skilled in the art. One skilled in the art will recognize that other systems, e.g., bevel gear arrangements, could be used instead and still work with the disclosed blade retention processes.

Figure 2:
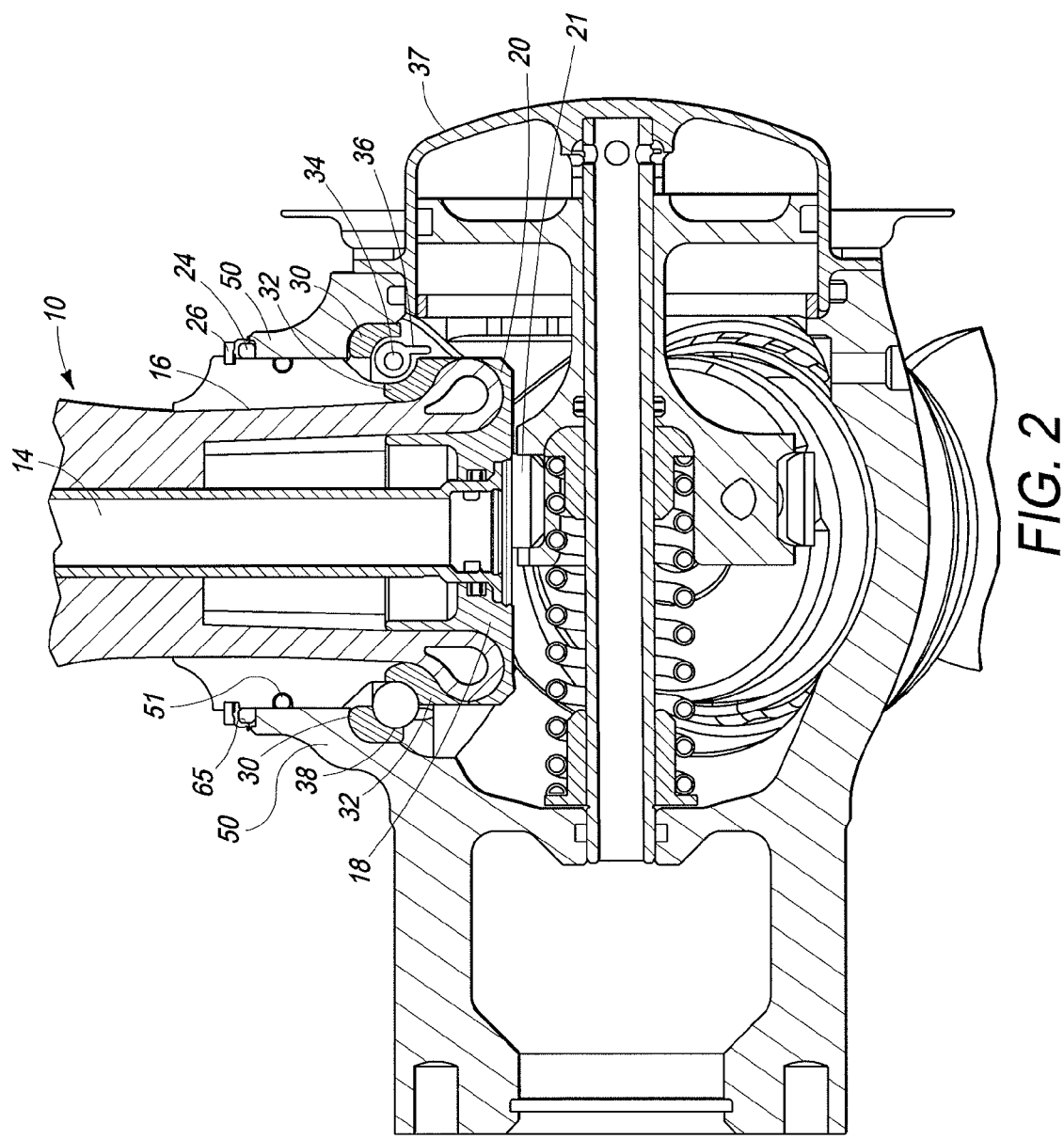
FIG. 2 shows a sectional view taken in a plane taken from the axis of rotation for the propeller-blade-retention arrangement for the first embodiment.

FIG. 2 shows blade 10 secured in a hub 50 after a snap ring 26 and a shim arrangement 24 have been installed. The figure is also helpful in showing the overall orientations of the various parts which will be further described in discussions regarding the other figures.

Figure 3:
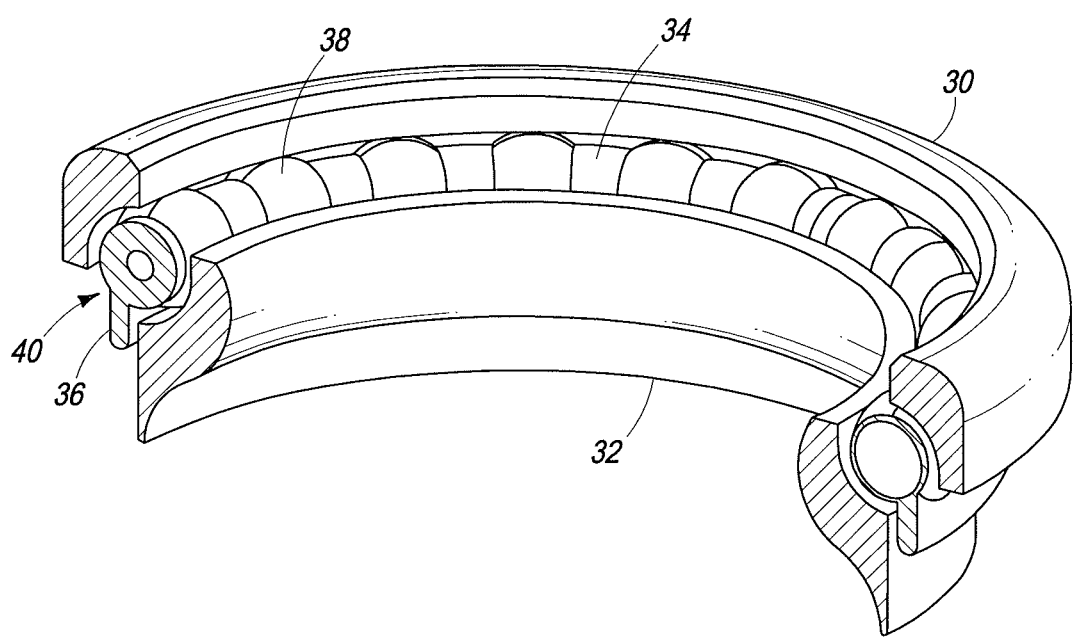
FIG. 3 shows the bearing-race arrangement of the blade-retention mechanism with a removed portion showing the internals.

FIG. 3 shows the details for the bearings and races as they appear after a blade has already been installed in the hub. This figure shows the outer race 30 (which is press fit onto a surface 58 in a blade socket 54 in FIG. 4) and an inner race 32 (which is fixed to the bottom of the blade 10 as shown in FIG. 1). Even though the front portions of races 30 and 32 shown in FIG. 3 are removed, it should be understood that they are actually of one piece ring-like construction. A plurality of angular contact ball bearings 38, after installation, will be angularly sandwiched between the races 30 and 32 as shown in FIG. 3. Thus, outer race 30 bears on each ball bearing at a direction that is inward and down, whereas inner race 32 applies an opposing force on each ball bearing that is outward and up. Ball bearings used in this type of arrangement are sometimes referred to as "angular contact" ball bearings. It will be described later, that because these races are offset, they make the installation of the blade into a unitarily constructed hub possible in ways not before possible. Each ball bearing is a standard ball bearing of unitary construction. Although the ball bearings 38 are separate devices, they are all included in a stringer 40. The stringer arrangement 40 includes separator portions 34 and a common spine 36. The spine 36 serves to connect each of the separator portions 34 together so that the stringer assembly 40 is actually of unitary construction.

Figure 4:
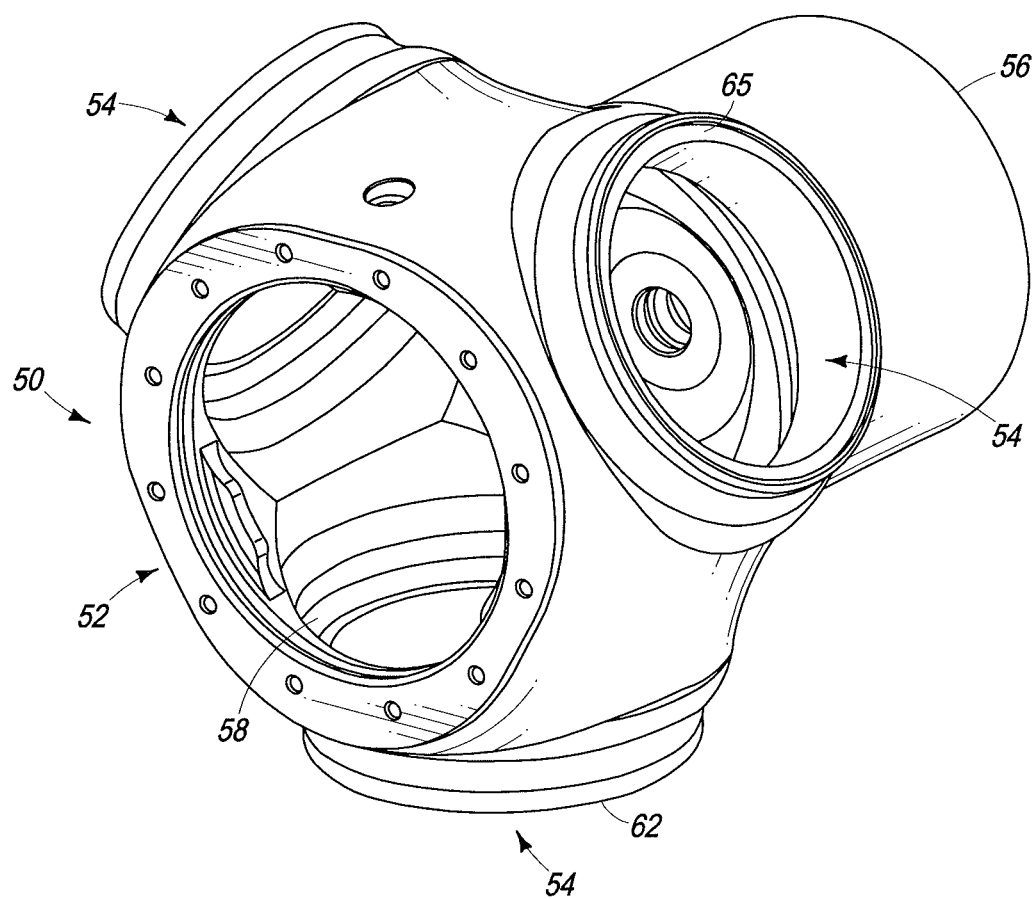
FIG. 4 shows an integral one-piece hub used for retaining the propeller blades.

Shim arrangement 24 and snap ring 26 are snapped into annular channels at a step in the installation process to secure the blade in a hub 50 in one of three sockets 54. The hub and sockets are shown in FIG. 4. The hub is a forged and machined part of single-piece construction. Hub 50 also includes a front cylinder can opening 52. The can is bolted to this and used to enclose a fluid reservoir which is used for hydraulic control purposes. The hub 50 is mounted on the aircraft at the rear of the hub at an engine/crank shaft mounting end 56. Inside each of the three sockets 54, there is a bearing surface 58. This is where outer race 30 will be press fit as an initial step in securing each blade in the hub.

Reference back to FIG. 2 which shows a view of one blade installed in the hub in cross section at the blade axis of rotation is helpful in understanding how the already-described components are used in the assembly process. The steps for executing that process will now be described.

Figure 5:
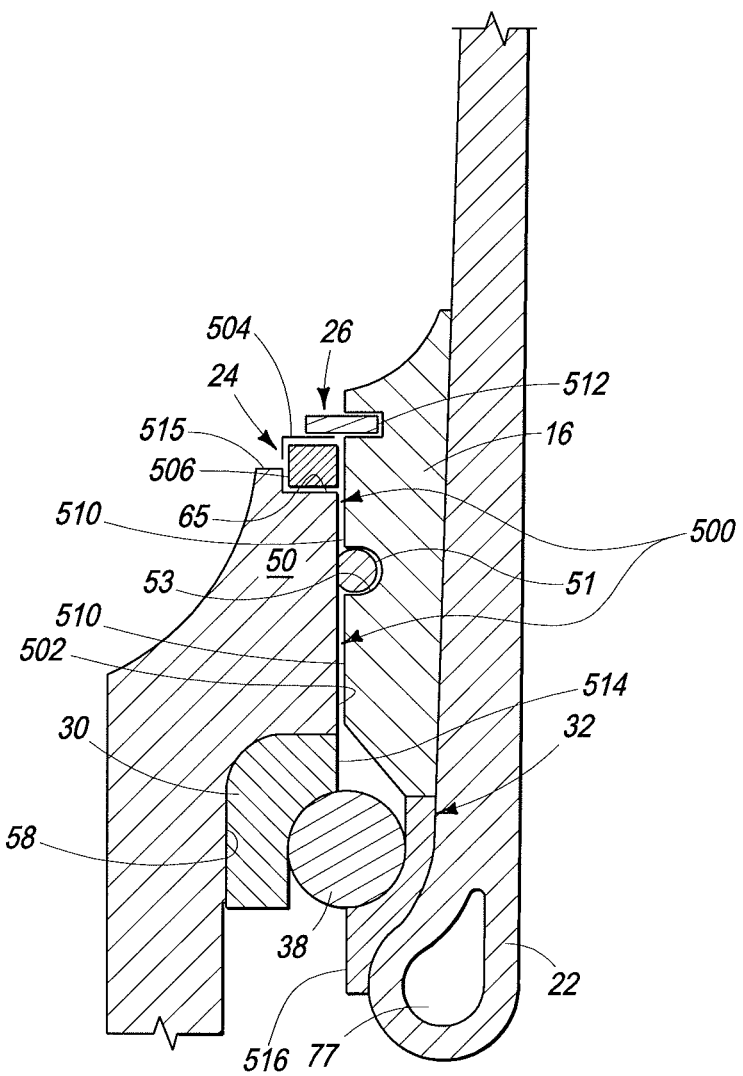
FIG. 5 is an enlarged cross sectional view of a blade/hub interface for the first embodiment for a propeller-blade-retention system.

FIG. 5 shows a close up cross-sectional view at the blade/hub interface 500. More specifically, it can be seen that interface 500 is defined primarily between the substantially cylindrical outer surface of the blade collar 16 and a matching inner surface 502 of socket 54 of hub 50, but also includes the opposing cylindrical surfaces 514 and 516 of outer race 30 and inner race 32, respectively. Interface 500, when viewed in cross section, is in a substantially straight line. This is because the diameter of the outside surfaces of collar 16 are substantially the same at all interface locations. This is true not only for the outer bearing cylindrical surface 510 which defined an annular groove 53 which is adapted to receive and contain a sealing member, in this embodiment, an O-ring 51, but also for an outer diameter 516 for race 32. It should be noted that because of the substantially cylindrical nature of interface 500, inner race 32 and outer race 30 can pass each other despite their integral construction. Adequate sizing of the hub opening 52 allows installation of integral race 30. The construction process of the blade makes it possible to install integral race 32 on the base of the blade.

A substantially cylindrical inside surface 502 of hub socket 54 is bored or otherwise formed at a diameter which is only slightly larger than the outside diameter of the blade collar 16. This includes the inside diameter of surface 514 of race 30. Because of this, the blade, along with sealing member 51, will be slidably receivable in the blade socket before ball bearings 38 are installed. One way this differs from the traditional processes is that the sealing mechanics are installed simultaneously with the introduction of the blade. Conventionally, the fluid seals have had to be externally mounted after the blade was locked in place. The details regarding installation will be discussed in detail below.

Figure 6:
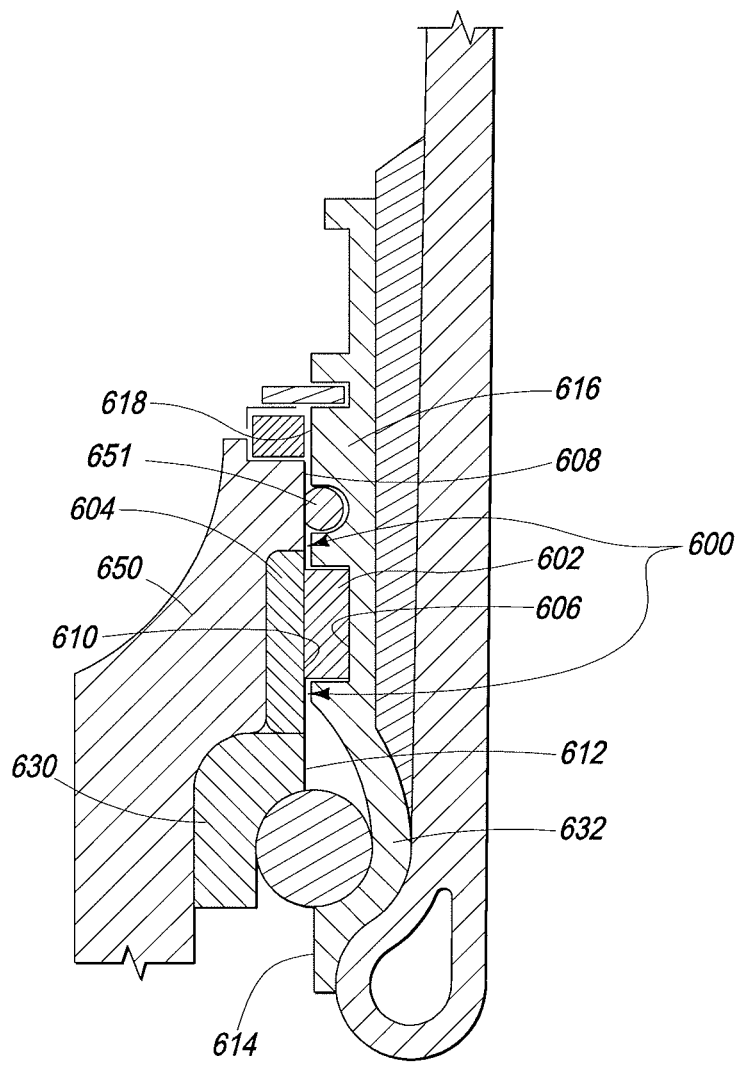
FIG. 6 is an enlarged cross sectional view of an alternative second embodiment for a propeller-blade-retention system.

It should be noted that although sealing member 51 is shown in the FIGS. 5 and 6 embodiments as being an O-ring, that numerous other sealing members or systems, e.g., Chevron seals, radial-lip seals, could be used instead and still fall within the broad aspects of these disclosures. Additionally, although the annular channel used to receive O-ring 51 is shown in the drawings as being formed in the outer cylindrical surface 510 of the blade collar 16 such that it bears against the substantially cylindrical internal surface 502 of the socket, it should be understood that, alternatively, the annular receiving channel for O-ring 51 could be received in an annular channel defined in the substantially cylindrical internal surface 502 of the socket such that it bears against the substantially cylindrical outer surface 510 of the collar.

Also evident from this view of interface 500 is that the shim arrangement 24 includes both a shim body 506 and a carrier 504. Shim arrangement 24 when installed is received by an annular notch 65 formed in the upper part of a hub socket (e.g., one of the plurality of sockets 54). Shim 506 is laterally retained by an inside surface of an upcrop portion 515. Carrier 504 is sandwiched between the upper surface of shim 506 and the underside of snap ring 26. Snap ring 26 is received in an annular groove 512 defined in the outer cylindrical surface 510 of the blade collar 16. As those skilled in the art will recognize, the snap ring is substantially continuous, but open-ended. Much like with the common piston ring, the open-endedness of ring 26 provides it with the moderate flexibility necessary to snap it into groove 512, but once installed it will prevent the blade from moving into the hub socket 54, while the already-installed angular contact bearings 38 prevent movement out. Thus, the blade is effectively locked in place and cannot translate in any axial direction. It should also be understood that the locking arrangement might also be reversible from hub to blade or in some other fashion. Thus, the scope of the disclosed system and processes should not be limited to the arrangements disclosed unless otherwise specified in the claims.

The process of assembling the blades into the hub will now be discussed. First, looking at FIG. 4, the rear/engine end 56 of unitary hub 50 is secured on a tool (not shown) such that a first socket 62 of the plurality of sockets 54 is positioned downward as shown. Then, or before as a preliminary, outer race 30 is press fit onto bearing surface 58 for that particular socket 62. Race 30 is able to be installed as an integral piece through hub opening 52. After race 30 is in place, the user picks up a blade 10. The snap ring 26 and shim arrangement 24 features are not yet in place on the device. (These features will later be installed into their ultimate reciprocating locations to lock the blade into position.) Snap ring 26 and shim carrier 504, however, should be preloaded onto the blade by sliding it onto the airfoil portion so that it will be ready for installation later.

Grabbing the blade by its airfoil, the user then inserts the bottom base end (which includes collar 16) up through bottom socket 54 until inner race 32 has been translated to a position slightly past the final assembled and seated bearing position of outer race 30. This presents an annular gap between races 30 and 32 into which the ball bearing string 40 can be inserted by the user alone or a partner. The positions of races 30 and 32 relative to one another, and the determination of whether the desired position has been achieved, can be seen by looking through front cylinder can opening 52 (see FIG. 4). Before this, as a preliminary, the user or a partner will have already secured each of the ball bearings 38 into the stringer assembly 40. That preliminary action presumed, the partner, will then, reaching though front opening 52, string the ball bearings into the annular gap created between races 30 and 32 until all of the ball bearings have been installed, and spine 36 is pointing downward. Once so positioned, the blade can be released, causing ball bearings 38 in stringer 40 to be mashed between races 30 and 32 by the gravitational force of the blade, which is hanging down through socket 62.

Now that the bearings have been installed, the blade cannot escape outward away from the hub. Next, the blade is locked against falling into the hub by installing the shim arrangement 24 and snap ring 26. To do this, the shim arrangement is first brought into position into the annular notch 65 (See FIGS. 4 and 5) which is defined in the hub. Next, snap ring 26, which as described above was preloaded onto the blade over the airfoil section, is snapped into annular groove 512 which goes around the upper outside portion of collar 16. This secures the first blade against moving axially into the hub socket thereby locking stringer 40 and balls 38 in the assembly even when the propeller is turned over on the mount.

Once the first blade is installed, the user will be able to rotate the hub around on the tool (not shown) so that another of sockets 54 is pointed down. At that time, a second blade is selected and the same procedures discussed above are repeated to install it in the second socket. Finally, these same processes are used to install the third blade in the third remaining socket to complete the blade attachments. One skilled in the art will recognize that these same general processes could be followed to install and then retain blades in hubs adapted to hold two or more blades.

Once all three blades have been attached, the control components are installed using known techniques. Then, a nose can 37 is installed over the front cylinder can opening 52, and other known procedures are instituted to complete the installation process.

Once installed, each blade 10 is able to rotate about its longitudinal axis for variable pitch when pin 20 is acted on by an actuator mechanism 21 (see FIG. 2) in which pin 20 is received. The angular contact roller bearings 38 existing between inner and outer races 32 and 30 enable this rotation. As this rotation occurs, the mated relations between the outer cylindrical surface 510 of collar 16 inside of the cylindrical internal surface 502 of the hub socket provide the dynamic stability necessary and react the bending loads from the blade.

In other embodiments of the invention, an additional set of roller bearings are provided between the outer cylindrical surface of the collar 16 and the inside surfaces of socket 54 in hub 50 to reduce friction and increase the load-bearing capacity.

Because of the system disclosed, races 30 and 32 and hub 50 that are each of unitary construction. Conventionally, artisans have had to use two part races and/or two or more part hubs to accomplish these objectives. The unitary nature of the device herein, however, enables drastic reduction in weight, which is critical to aircraft performance and highly desirable. Further, the design and assembly processes disclosed herein enable the use of a truly integral hub. Some conventional designs, e.g., U.S. Pat. No. 4,921,403 issued to Poucher et al., require clamping sealing rings which are bolted onto the upper portion of the hub socket and are necessarily removable because of assembly requirements. Here, however, the hub is completely integral while still enabling blade installation. This reduces the number of potential leak paths available for the control and lubrication fluids existing in the hub dramatically improving the overall quality of the hub-to-blade seal.

An alternative embodiment for a blade/hub interface 600 is shown in FIG. 6. Like the earlier embodiment, the assembly has a collar 616 which includes an O-ring 651 in an annular groove. Unlike the FIG. 5 embodiment, this embodiment includes a plurality of outboard roller bearings 602 which are embedded into an annular slot 606 in collar 616 and which engage the inner surfaces of an outer bearing race 604. It will be recalled that the FIG. 5 embodiment simply allowed for rotation between outer surface 510 of blade collar 16 and inner surface 502 of the hub socket. While the system of FIG. 5 might be most desirable for light aircraft propeller assemblies, the frictional resistance created by the assembly might be too great for use with larger aircraft propellers. Because of this, the roller 602 and outer bearing 604 arrangement of FIG. 6 creates an interface 600 which offers less frictional resistance and greater load-bearing capacity. Another difference is that collar 616 is able to be constructed of metal rather than the plastic described for collar 16. Because of this, the collar 616 is able to be integral with the blade angular contact bearing race 632.

In terms of installation, the FIG. 6 embodiment also allows for the same installation processes discussed for the FIG. 5 embodiment. This is because roller bearings 602 are embedded in an annular channel defined in collar 616. Even though bearings 602 extend out to the extent necessary to engage outer bearing 604, they do not extend out so far that the blade collar, once loaded with bearings, will not fit through the cylindrical cavity defined by internal surfaces 608, 610, and 612. Similarly, the external cylindrical surfaces of the blade collar, e.g., surface 616, are also created such that they do not interfere with the blade being axially slidable into the collar. Thus, this arrangement enables the same assembly processes discussed above, as well as enabling the use of integral races and a truly integral hub.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A propeller system, said system comprising:
    a hub including a socket, the hub including an upper and a lower end, said socket having a substantially cylindrical internal surface;
    an adjustable-pitch blade received in said hub, said blade having an airfoil portion extending in an axially outward direction from the socket, and a base portion included in the socket;
    a substantially cylindrical outer surface of said base portion of said blade, said outer surface of said base portion of said blade being slidably receivable in said substantially cylindrical internal surface of said socket;
    a locking assembly including a snap ring disposed adjacent the upper end of the hub, the snap ring securing a shim in position against a hub surface and a hub upcrop surface, the hub upcrop surface preventing dislocation of the shim in a direction parallel to the hub surface, wherein the locking assembly, when fully installed, prevents axial translation in the hub which is otherwise axially slidable;
    a sealing member received in an interface between said substantially cylindrical outer surface of said base portion of said blade and said substantially cylindrical internal surface of said socket, said sealing member forming a fluid barrier between an inside and an outside of said socket while still allowing for axial translation of said blade into said socket during installation and rotation of said blade to change pitch;
    an angular contact bearing arrangement located further inside said socket, said bearing arrangement including a set of bearing balls included between an inner race on said blade and an outer race on said hub, said inner race having an outer diameter which is small enough to enable passage through said substantially cylindrical internal surface of said socket during installation, said outer race having an inside diameter large enough to not interfere with said substantially cylindrical outer surface of said base portion of said blade during installation;
    the substantially cylindrical outer portion of the base portion of the blade presenting an outer bearing surface which is axially outward from the angular contact bearing balls, each of the angular contact bearing balls and the outer bearing surface transferring blade loads directly to the hub;
    an outboard roller bearing having a plurality of outboard rollers embedded into an annular slot in a collar for engagement with an inner surface of an outer bearing race, wherein the outer bearing race of the roller bearing is in direct contact with the hub; and
    an upper surface of the outer race of the angular contact bearing is in direct contact with a lower surface of the outer race of the roller bearing; and the inner surface of the outer bearing race of the roller bearing is radially flush with an inner surface of the outer race of the angular contact bearing.

2. The system of claim 1 wherein said hub is formed from substantially integral materials.

3. The system of claim 1 wherein said inner race of the angular contact bearing arrangement is formed as a substantially-integral part adapted to be installed all at once.

4. The system of claim 1 wherein said outer race of the angular contact bearing arrangement is formed as a substantially-integral part and is adapted to be installed all at once.

5. The system of claim 1 wherein an inner race of the outboard roller bearing is formed as an integral part of the collar, said outer race of the outboard roller bearing is formed as an integral part of said hub and said inner and outer races of the outboard roller bearing are able to be installed without compromising structural integrity.

6. The system of claim 1 wherein said substantially cylindrical outer surface exists on the collar provided on said base portion of said blade.

7. The system of claim 6 wherein said sealing member is an O-ring which is received in an annular channel defined in said substantially cylindrical outer surface of said collar on said base portion and bears against said substantially cylindrical internal surface of said socket.

8. The system of claim 1 wherein said sealing member forms a direct seal between the substantially cylindrical outer surface of the collar on the base portion and the substantially cylindrical internal surface of the socket and forms a complete fluid seal between the socket and the blade.

9. The system of claim 7 wherein said O-ring is received in an annular channel defined in said substantially cylindrical internal surface of said socket and bears against said substantially cylindrical outer surface of said collar.

10. The system of claim 6 wherein an upper portion of said substantially cylindrical outer surface on said collar defines an annular groove which receives the snap ring which, when installed in said annular groove, prevents said blade from falling into said socket when an upcrop portion on said socket is engaged.

11. The system of claim 10 wherein said snap ring prevents said blade from falling into said socket by resting on the shim nested in an annular notch defined in said upcrop portion of said socket.

12. The system of claim 1 wherein each of said: (i) outer diameter of said inner race of angular contact bearing arrangement, (ii) an inner diameter of said outer race of angular contact bearing arrangement, (iii) substantially cylindrical internal surface of said socket, and (iv) substantially cylindrical outer surface of said bottom portion of said blade are substantially in line when viewed in cross section.

13. A method of assembling a propeller system, said method comprising:
    manufacturing an integral hub, the hub including an upper end and lower end;

causing a blade-receiving socket to be formed in said hub, said socket having a substantially cylindrical internal surface;

producing a blade to have a base portion which has a substantially cylindrical outer surface which is receivable in and slidably mates with said substantially cylindrical internal surface of said socket;

providing an angular contact bearing arrangement inside said socket, said bearing arrangement including an inner race and an outer race, the outer race in contact with said hub, said angular contact bearing arrangement preventing said blade from coming out of said hub socket, while allowing for rotation on a center axis of said blade;

providing an outboard roller bearing having a plurality of outboard rollers embedded into an annular slot in a collar for contact with an inner surface of an outer bearing race of said outboard roller bearing, wherein the collar is integral with an inner race of the outboard roller bearing, wherein said inner surface of said outer race of said outboard roller bearing is radially flush with an inner surface of said outer race of said angular contact bearing arrangement; and an upper surface of the outer race of the angular contact bearing is in direct contact with a lower surface of the outer race of the roller bearing;

including a locking mechanism to secure said blade against sliding into said hub after installation when blade is at an upright angle, the locking mechanism including a snap ring disposed adjacent the upper end of the hub, the snap ring securing a shim in position against a hub surface and a hub upcrop surface, the hub upcrop surface preventing dislocation of the shim in a direction parallel to the hub surface, wherein the locking mechanism, when fully installed, prevents axial translation of the hub which is otherwise axially slidable; and establishing a ring-shaped seal between said substantially cylindrical outer surface of said base portion of said blade and said substantially cylindrical internal surface of said socket, the ring-shaped seal preventing the outflow of fluids through the substantially cylindrical internal surface and the substantially cylindrical outer surface.

14. The method of claim 13 comprising: executing said manufacturing step by machining forged metal.

15. The method of claim 13 comprising:
installing said angular contact bearing arrangement to include the inner race on said blade and the outer race in said hub;
adapting said inner race of said angular contact bearing to have an outer diameter small enough to enable passage through said substantially cylindrical internal surface of said socket during installation;
adapting said outer race of said angular contact bearing to have an inside diameter which prevents interference with said substantially cylindrical outer surface of said bottom portion of said blade during installation; and
inserting a set of bearing balls between said inner and outer races of said angular contact bearing arrangement.

16. The method of claim 15 comprising:
adapting said outer race of said angular contact bearing to be installed integrally through an opening in said hub other than said socket.

17. The method of claim 13 comprising:
establishing said seal by including an O-ring in an annular channel defined in said substantially cylindrical outer surface of said base portion of said blade such that said O-ring seals against said substantially cylindrical internal surface of said socket.

18. The method of claim 13 comprising:
establishing said seal by including an O-ring in an annular channel defined in said substantially cylindrical internal surface of said socket such that said O-ring seals against said substantially cylindrical outer surface of said base portion of said blade.

19. The method of claim 13 comprising:
orienting said seal such that said seal is engaged upon a sliding installation of said blade inside said socket and remains engaged while a set of ball bearings are installed into said angular contact bearing arrangement.

20. A propeller blade retention system comprising:
an integral hub including a plurality of sockets, the integral hub having an upper and lower end;
each of said sockets being adapted to establish a substantially cylindrical interface with a respective set of blades such that each of said blades is slidably receivable for installation into each of said sockets, and also resist bending loads during use;
each of said blades being held inside and made axially rotatable by an angular contact bearing arrangement having a set of bearing balls, wherein the set of bearing balls rotate against a lower bearing surface;
each of said blades having an upper bearing surface located above the set of bearing balls and defined by the substantially cylindrical interface;
the angular contact bearing arrangement disposed inside said socket, said bearing arrangement including an inner race and an outer race, the outer race in contact with said hub, said angular contact bearing arrangement preventing said blade from coming out of said hub socket, while allowing for rotation on a center axis of said blade;
an outboard roller bearing having a plurality of outboard rollers embedded into an annular slot in a collar for contact with an inner surface of an outer bearing race of said outboard roller bearing, wherein the collar is integral with an inner race of the outboard roller bearing and the inner surface of said outer race of said outboard roller bearing is radially flush with an inner surface of said outer race of said angular contact bearing arrangement; and an upper surface of said outer race of said angular contact bearing arrangement is directly in contact with a lower surface of said outer race of said outboard roller bearings;
each of said blades being secured against falling into the hub after installation by a locking mechanism, the locking mechanism including a snap ring disposed adjacent the upper end of the hub and a shim secured in position against a hub surface and a hub upcrop surface, the hub upcrop surface preventing dislocation of the shim in a direction parallel to the hub surface; and
a sealing member provided in the substantially cylindrical interface to create a seal.

21. A propeller bearing against a race on an integral hub comprising:
the integral hub including a plurality of sockets, the hub including an upper end and a lower end;
each of said sockets being adapted to receive a blade such that each blade is slidably receivable for installation into each of said sockets, and also resist bending loads during use;
each of said blades being secured inside and made axially rotatable by a set of angular contact bearing balls, the angular contact bearing balls bearing against an outer race on the sockets to prevent each blade from translating outward from the hub;

the angular contact bearing balls also bearing against an inner race;

an outboard roller bearing having a plurality of outboard rollers embedded into an annular slot in a collar for engagement with an inner surface of an outer bearing race, wherein the collar is integral with an inner race of the roller bearing and an upper surface of the outer race of the angular contact bearing is directly in contact with a lower surface of the outer bearing race of the outboard roller bearing; and the inner surface of the outer bearing race of the roller bearing is radially flush with an inner surface of the outer race of the angular contact bearing;

each of said blades being secured against translating back into the hub after installation by a locking mechanism comprising a snap ring disposed adjacent the upper end of the hub, the snap ring securing a shim in position against a hub surface and a hub upcrop surface, the hub upcrop surface preventing movement of the shim in a direction parallel to the hub surface; and a sealing member provided in a substantially cylindrical interface to contain a fluid in the hub.

* * * * *